United States Patent
Chang et al.

(10) Patent No.: US 11,135,809 B2
(45) Date of Patent: Oct. 5, 2021

(54) THERMALLY-BONDABLE MULTI-LAYERED COMPOSITE FILM FOR MANUFACTURING OUTDOOR CLOTHING, AND METHOD FOR MANUFACTURING SAME

(71) Applicants: BRISTEX CO., LTD., Seoul (KR); SEALON CO., LTD., Seoul (KR)

(72) Inventors: Keun Hun Chang, Seoul (KR); Jin Seoup Cha, Seoul (KR)

(73) Assignees: BRISTEX CO., LTD., Seoul (KR); SEALON CO., LTD., Seoul (KR)

( * ) Notice: Subject to any disclaimer, the term of this patent is extended or adjusted under 35 U.S.C. 154(b) by 0 days.

(21) Appl. No.: 17/268,126

(22) PCT Filed: Dec. 31, 2019

(86) PCT No.: PCT/KR2019/018815
§ 371 (c)(1),
(2) Date: Feb. 12, 2021

(87) PCT Pub. No.: WO2020/141866
PCT Pub. Date: Jul. 9, 2020

(65) Prior Publication Data
US 2021/0162710 A1  Jun. 3, 2021

(30) Foreign Application Priority Data
Jan. 3, 2019  (KR) ........................ 10-2019-0000505

(51) Int. Cl.
*B32B 7/14*  (2006.01)
*B32B 5/02*  (2006.01)
(Continued)

(52) U.S. Cl.
CPC ................ *B32B 7/14* (2013.01); *B32B 5/026* (2013.01); *B32B 25/12* (2013.01); *B32B 25/14* (2013.01);
(Continued)

(58) Field of Classification Search
CPC ........ B32B 2307/1215; B32B 2262/02; B32B 2262/06; B32B 2262/08; B32B 2307/724;
(Continued)

(56) References Cited

FOREIGN PATENT DOCUMENTS

| JP | 5691887 B2 | 4/2015 |
|----|------------|--------|
| JP | 2017121779 A | 7/2017 |

(Continued)

OTHER PUBLICATIONS

International Search Report (with partial English Translation) and Written Opinion issued in corresponding International Patent Application No. PCT/KR2019/018815, 10 pages (dated Jun. 12, 2020).

(Continued)

*Primary Examiner* — Lawrence D Ferguson
(74) *Attorney, Agent, or Firm* — Buchanan Ingersoll & Rooney PC

(57) ABSTRACT

Provided are a multi-layered composite film that may be thermally-bonded to a fabric by using a hot melt adhesive that is dot-coated on the surface thereof, and a method of manufacturing the same. In particular, the present invention relates to: a thermally-bondable multi-layered composite film which can be used in the manufacture of outdoor clothing, has excellent breathability and waterproofing properties, and can simplify the process of manufacturing the outdoor clothing; and to a method for manufacturing same.

11 Claims, 4 Drawing Sheets

(51) Int. Cl.
*B32B 25/12* (2006.01)
*B32B 25/14* (2006.01)
*B32B 27/12* (2006.01)
*B32B 27/30* (2006.01)
*B32B 27/32* (2006.01)
*B32B 27/34* (2006.01)
*B32B 27/36* (2006.01)
*B32B 27/40* (2006.01)
*B32B 37/12* (2006.01)

(52) U.S. Cl.
CPC ............ *B32B 27/12* (2013.01); *B32B 27/304* (2013.01); *B32B 27/306* (2013.01); *B32B 27/308* (2013.01); *B32B 27/32* (2013.01); *B32B 27/322* (2013.01); *B32B 27/34* (2013.01); *B32B 27/36* (2013.01); *B32B 27/40* (2013.01); *B32B 37/1292* (2013.01); *B32B 2037/1215* (2013.01); *B32B 2262/02* (2013.01); *B32B 2262/06* (2013.01); *B32B 2262/08* (2013.01); *B32B 2307/724* (2013.01); *B32B 2307/7265* (2013.01); *B32B 2437/00* (2013.01)

(58) Field of Classification Search
CPC ........ B32B 2307/7265; B32B 2437/00; B32B 25/12; B32B 25/14; B32B 27/12; B32B 27/304; B32B 27/306; B32B 27/308; B32B 27/32; B32B 27/322; B32B 27/34; B32B 27/36; B32B 27/40; B32B 37/1292; B32B 5/026; B32B 7/14
See application file for complete search history.

(56) References Cited

FOREIGN PATENT DOCUMENTS

| | | |
|---|---|---|
| KR | 20010076027 A | 8/2001 |
| KR | 20100126940 A | 12/2010 |
| KR | 20120140205 A | 12/2012 |
| KR | 20160072086 A | 6/2016 |
| KR | 20170127760 A | 11/2017 |
| WO | 2015026068 A1 | 2/2015 |

OTHER PUBLICATIONS

Non-Final Office Action (with English translation) issued in corresponding Republic of Korea Patent Application No. 10-2019-0000505, 13 pages (dated Sep. 30, 2019).

Notice of Allowance (with English translation) issued in corresponding Republic of Korea Patent Application No. 10-2019-0000505, 4 pages (dated Dec. 27, 2019).

THERMALLY-BONDABLE MULTI-LAYERED COMPOSITE FILM FOR MANUFACTURING OUTDOOR CLOTHING, AND METHOD FOR MANUFACTURING SAME

TECHNICAL FIELD

The present invention relates to a thermally-bondable multi-layered composite film for preparing a functional fabric for outdoor clothing and a method of preparing the composite film, and more particularly, to a thermally-bondable multi-layered composite film and a method of preparing the same, the composite film being attached on one side of a fabric substrate such as a woven fabric by applying heat and pressure to the fabric substrate, thereby allowing simple manufacture of a functional fabric for outdoor clothing, and thermal bonding having functionality, such as breathability and waterproofing properties or heat-retaining properties, etc.

BACKGROUND ART

Generally, breathable waterproof fabrics refer to fabric materials that allow water vapor such as sweat inside the clothing to pass through to the outside and block moisture such as rain from the outside not to seep into the clothing, and thus the fabrics are prepared not to be wet by rain or snow (waterproof) and to discharge sweat (breathable) to help controlling body temperature and maintaining comfortable feeling of the wearer.

When the wearer is sweating due to increased activity in cold environments, the fabrics serve as a medium controlling the transfer of heat and moisture between the human body and the environment, and thus prevent condensation of the sweat in the clothing.

In recent years, with increasing interest in health and leisure activities, breathable waterproof fabric has been applied to various fields, and these functionalities have been further emphasized in line with the boom for luxury and well-being.

In addition, with the introduction of a 52-hour work week, leisure time has increased, and the lifestyle that emphasizes a comfortable and relaxed life has become a trend, and thus outdoor clothing industries have posted high sales growth every year.

Techniques for manufacturing the breathable waterproof fabric may be a wet method, a dry method, and a laminating method, and the laminating method prepares a breathable waterproof fabric by separately preparing a membrane having a breathable waterproof property and then bonding the membrane with a fabric using an adhesive.

The prior arts of a membrane for preparing a breathable waterproof fabric using the laminating method may include Korean Patent Publication No. 2017-0127760 (Nov. 22, 2017), which discloses a unidirectional breathable waterproof multilayer membrane and a method of preparing the same, the membrane including a first porous layer including first nanofibers formed of a hydrophobic polymer; a non-porous layer; and a second porous layer including second nanofibers containing or coated with an absorptive material, and Korean Patent Publication No. 2010-0126940 (Dec. 3, 2010), which discloses a breathable waterproof membrane with excellent breathability and moisture permeability and a process for preparing the same, the method including laminating polyurethane beads in the cross-linked state on a releasing paper and forming a number of fine pores between the polyurethane beads to prepare the membrane.

However, the membrane structure for preparing a breathable waterproof fabric according to the prior arts may result in uneven coating distribution of a liquid adhesive when bonding the membrane to a fabric, and this may cause problems such as uneven breathing efficiency and degrading breathability as the liquid adhesive seeps into the fabric. In particular, the membrane structure attached to the fabric substrate may be poor in peeling durability or abrasion durability, and thus washing durability of outdoor clothing manufactured using the membrane structure may not be secured.

DETAILED DESCRIPTION OF INVENTION

Technical Problem

Provided are a thermally-bondable multi-layered composite film and a method of preparing the same, the composite film being applied to preparation of outdoor clothing, thereby capable of giving excellent functions such as breathability and waterproofing properties or heat retaining properties to a fabric prepared using the composite film, particularly giving washing durability to outdoor clothing prepared using the composite film, and simplifying a preparation process of the outdoor clothing. However, the technical problems to be resolved by the present invention are not limited to the above-described problems, and other problems which not described above may be clearly understood by those skilled in the art through the following description.

Solution to Problem

According to an aspect of the present invention, a thermally-bondable multi-layered composite film 100 includes a breathable waterproof membrane layer 50; a base layer 55 disposed on an upper portion of the breathable waterproof membrane layer 50; a hot-melt adhesive layer 30 disposed on an upper portion of the base layer 55; a second adhesive layer 20 disposed on a lower portion of the breathable waterproof membrane layer 50; and a knitted layer 10 disposed on a lower portion of the second adhesive layer 20, wherein the hot-melt adhesive layer 30 and the base layer 55 may be preferably provided in the form of dots, and the hot-melt adhesive layer 30 may be preferably disposed on the base layer 55, thereby forming a double dot layer 60.

Also, the second adhesive layer 20 may be preferably formed in the form of dots or as a coating disposed on an entire surface. The knitted layer 10 may be preferably a warp knitted fabric or a circular knitted fabric. A basis weight of the knitted layer 10 may be preferably in a range of 15 g/m$^2$ to 45 g/m$^2$. A moisture permeability of the thermally-bondable multi-layered composite film 100 may be preferably in a range of 3,000 g/m$^2$/24 h to 50,000 g/m$^2$/24 h.

Also, the knitted layer 10 may be preferably prepared of at least one selected from the group consisting of vegetable fibers, animal fibers, and synthetic fibers. The base layer 55 may be preferably formed of one selected from an acryl-based resin, a polyurethane-based resin, a polyamide-based resin, a polyester-based resin, a polyolefin-based resin, a polyvinyl chloride resin, and an ethylene vinyl acetate copolymer resin. The breathable waterproof membrane layer 50 may be preferably prepared of one selected from a polyurethane, polyethylene terephthalate, polybutylene terephthalate, a polyamide, polytetrafluoroethylene, a silicone resin, polyethylene, polypropylene, a vinyl chloride resin, a synthetic rubber, and natural rubber. The hot-melt adhesive layer 30 may be preferably formed of one selected from a polyamide-based resin, a polyurethane-based resin, an ethylene vinyl acetate copolymer resin, and a polyester-based resin. The second adhesive layer 20 may be preferably formed of at least one selected from the group consisting of a polyamide-based resin, a polyurethane-based moisture curing-type adhesive, a two-part type polyurethane adhesive, a thermosetting hot-melt polyurethane adhesive, an ethylene vinyl acetate-based adhesive, a polyester-based hot-melt adhesive, an acryl-based adhesive, and an ethylene vinyl acetate copolymer adhesive. Also, the double dot layer 60 may be preferably formed at a density in a range of 1 dot/cm$^2$ to 300 dots/cm$^2$, and a thickness of the breathable waterproof membrane layer 50 may be preferably in a range of 0.15 mm to 0.30 mm.

Also, according to another aspect of the present invention, a method of preparing the thermally-bondable multi-layered composite film 100 may preferably include a first step of preparing a breathable waterproof membrane layer 50; a second step of forming a second adhesive layer 20 on a lower portion of the breathable waterproof membrane layer 50; a third step of bonding a knitted layer 10 to the second adhesive layer 20; a fourth step of forming a base layer 55 on an upper portion of the breathable waterproof membrane layer 50; a fifth step of scattering hot-melt adhesive powders 35 on an upper portion of the base layer 55; a sixth step of removing by suction the hot-melt adhesive powders 35 other than the hot-melt adhesive powders 35 settled on an upper portion of the base layer 55; a seventh step of heat-fixing the hot-melt adhesive powders 35 settled on an upper portion of the base layer 55 to form a hot-melt adhesive layer 30 in the form of dots; and an eighth step of cooling the base layer 55 and the hot-melt adhesive layer 30.

Advantageous Effects of Invention

When a thermally-bondable multi-layered composite film 100 according to the present invention, is thermally bonded to a fabric substrate for preparation of clothing using a flat press or a roll press, manufacture of a functional fabric having breathability and waterproofing properties or heat retaining properties, etc. may be facilitated. Also, as a breathable waterproof functional fabric may be manufactured using a laminating process, steps of a sewing process for preparing outdoor clothing may be reduced, and thus price competitiveness of the final product may increase. In particular, the present invention does not use an inner lining when preparing outdoor clothing, and thus the preparing process of outdoor clothing may be simplified, tactile feel of the outdoor clothing may improve, and handling and processing properties of a membrane structure may improve, which may have an effect of improving the workability.

BEST MODE

It will be understood that the terms "include," "comprise," or "have" when used in this specification, specify the presence of stated features, numbers, steps, elements, components, or combinations thereof but do not preclude possibility of the presence or addition of one or more other features, numbers, steps, operations, elements, components, or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
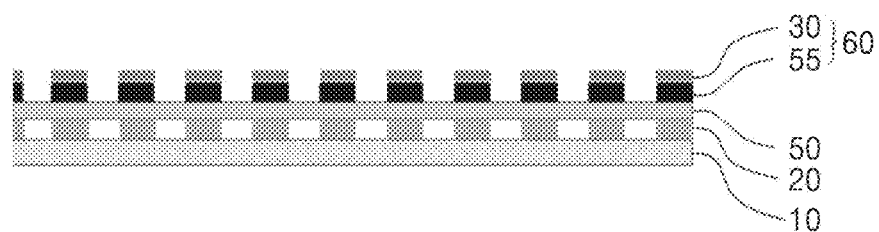
FIG. 1 is a cross-sectional view of a thermally-bondable multi-layered composite film 100 according to a first embodiment of the present invention.
Figure 2:
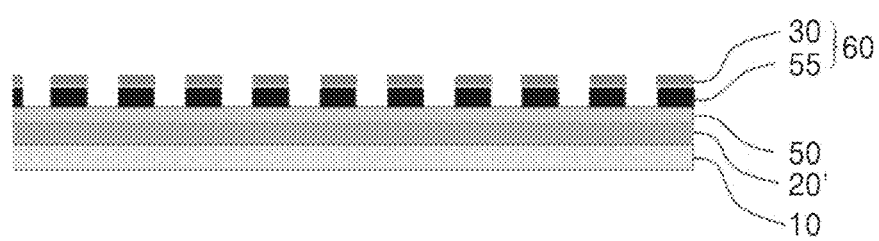
FIG. 2 is a cross-sectional view of a thermally-bondable multi-layered composite film 100 according to a second embodiment of the present invention.
Figure 3:
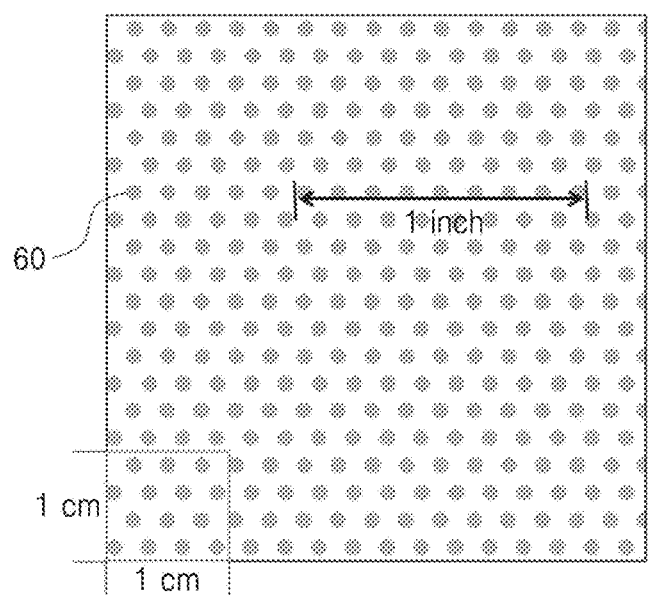
FIG. 3 is a plan view of a double dot layer 60 of a thermally-bondable multi-layered composite film 100 of the present invention.
Figure 4:
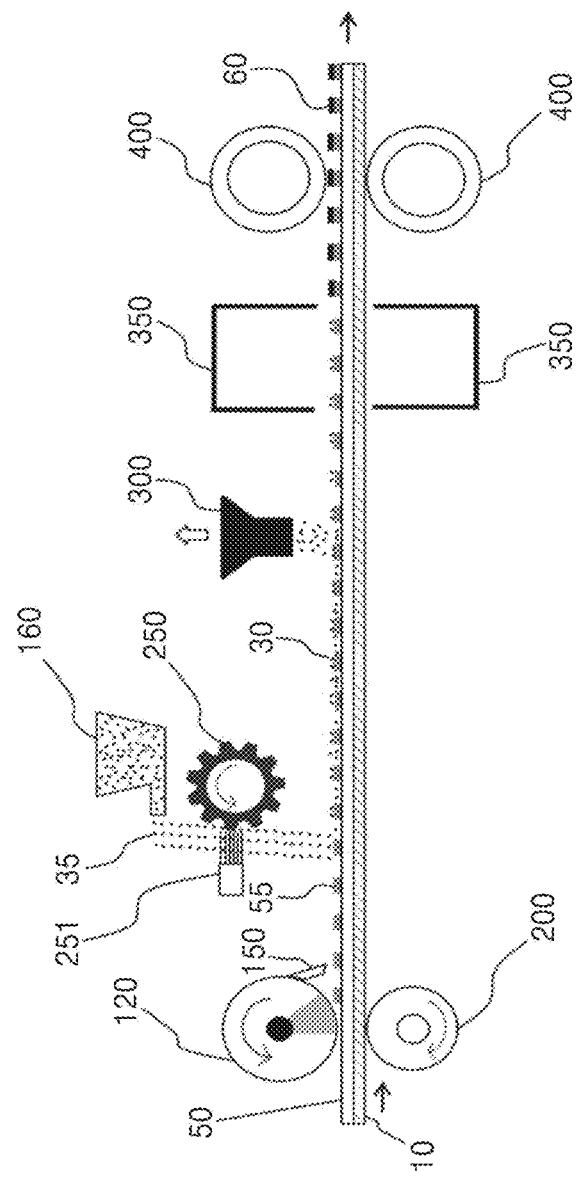
FIG. 4 is a preparing process diagram that shows a preparing process of the thermally-bondable multi-layered composite film 100 of the present invention.
Figure 5:
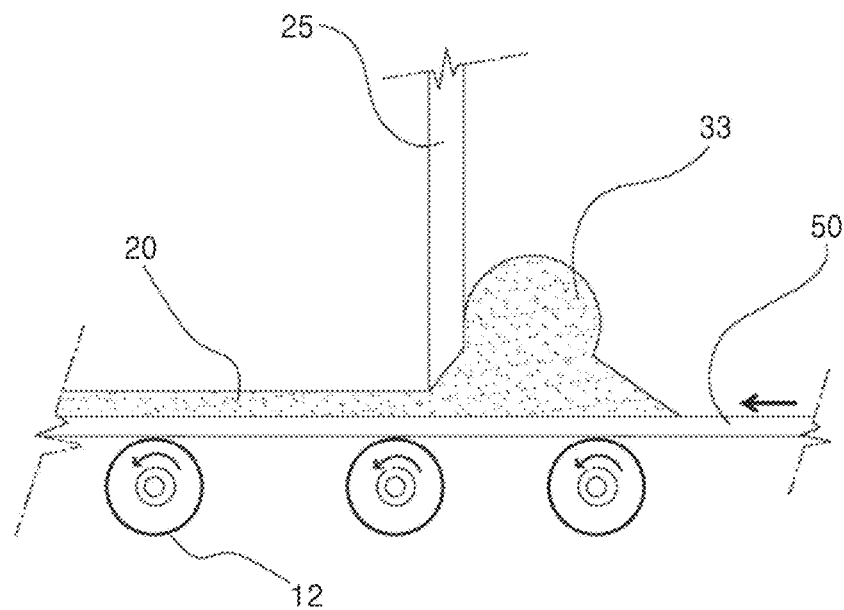
FIG. 5 is a process diagram that shows coating a solvent-based adhesive on a breathable waterproof membrane layer 50 of the present invention.
Figure 6:
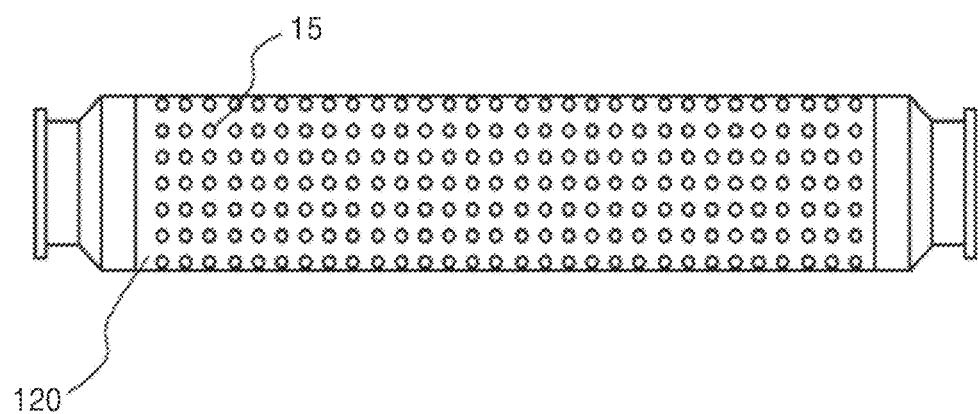
FIG. 6 is a schematic view of an upper screen roll 120 used in a coating process of a base resin of the present invention.

Hereinafter, a thermally-bondable multi-layered composite film 100 and a method of preparing the same according to the present invention will be described in detail with reference to the accompanying drawings. FIG. 1 is a cross-sectional view of a thermally-bondable multi-layered composite film 100 according to a first embodiment of the present invention, FIG. 2 is a cross-sectional view of a thermally-bondable multi-layered composite film 100 according to a second embodiment of the present invention, FIG. 3 is a plan view of a double dot layer 60 of a thermally-bondable multi-layered composite film 100 according to an embodiment of the present invention, FIG. 4 is a preparing process diagram that shows a preparing process of the thermally-bondable multi-layered composite film 100 according to an embodiment of the present invention, FIG. 5 is a process diagram that shows coating a solvent-based adhesive on a breathable waterproof membrane layer 50 according to an embodiment of the present invention, and FIG. 6 is a schematic view of an upper screen roll 120 used in a coating process of a base resin according to an embodiment of the present invention.

A thermally-bondable multi-layered composite film 100 of the present invention is attached to a fabric substrate during manufacture of outdoor clothing, etc. to give breathability and waterproofing properties or heat retaining properties to the fabric substrate. The thermally-bondable multi-layered composite film 100 of the present invention, as shown in FIG. 1, includes a breathable waterproof membrane layer 50; a base layer 55 provided on an upper portion of the breathable waterproof membrane layer 50; a hot-melt adhesive layer 30 provided on an upper portion of the base layer 55; a second adhesive layer 20 provided on a lower portion of the breathable waterproof membrane layer 50; and a knitted layer 10 provided on a lower portion of the second adhesive layer 20.

The hot-melt adhesive layer 30 may be provided in the form of dots on the base layer 55 provided in the form of dots, thereby forming a double dot layer 60.

That is, according to a first embodiment of the present invention, a breathable waterproof membrane layer 50 forming a basal layer is first needed to prepare a thermally-bondable multi-layered composite film 100 of the present invention. The breathable waterproof membrane layer 50 is attached on a fabric substrate and gives breathability and waterproofing properties to the fabric substrate to manufacture outdoor clothing.

That is, the breathable waterproof membrane layer 50 may not be particularly limited, as long as the film has flexibility. For example, the breathable waterproof membrane layer 50 may be prepared using one selected from a polyurethane, polyethylene terephthalate, polybutylene terephthalate, polytetrafluoroethylene, polyethylene, polypropylene, and a polyvinyl chloride resin.

That is, polytetrafluoroethylene may uniformly form fine pores in a membrane which may thus exhibit excellent moisture permeability, a polyurethane may vary such as a membrane having pores and a membrane having a hydrophilic property, and polyethylene terephthalate and polybutylene terephthalate may provide excellent tactile feel and durability at the same time providing excellent moisture permeability and waterproofness, and outstanding appearance. Also, a polyamide has excellent corrosion resistance, abrasion resistance, chemical resistance, and insulating property and thus is widely used in preparation of a breathable waterproof membrane.

Also, a polyolefin such as polyethylene or polypropylene may prepare a breathable waterproof membrane having excellent tactile feel and drapability, polyvinyl chloride may prepare a breathable waterproof membrane having excellent thermal shrinkage and excellent peeling strength.

Also, a thickness of the breathable waterproof membrane layer 50 used in the present invention may be preferably in a range of 0.10 mm to 0.30 mm. When the thickness of the breathable waterproof membrane layer 50 is within this range, clothing having excellent breathability and waterproofing properties may be manufactured as the breathable waterproof membrane layer 50 is applied to outdoor clothing, flexibility and tactile feel of the outdoor clothing may not be deteriorated, and thus activities performed while wearing the outdoor clothing may be easy, which allows manufacture of a variety of functional clothing products.

The thermally-bondable multi-layered composite film 100 of the present invention may include a base layer 55 transferred in the form of dots on the breathable waterproof membrane layer 50. The base layer 55 may be preferably included to prevent attachment of the breathable waterproof membrane layer 50 with another fabric and prevent sagging of the membrane layer 50 by gravity during preparation of the thermally-bondable multi-layered composite film 100 of the present invention, and thus a problem of workability deterioration may be prevented.

The base layer 55 may be formed using one selected from an acrylic resin, a polyurethane resin, a polyamide resin, a polyester resin, a polyolefin resin, a polyvinylchloride resin, and an ethylene-vinyl acetate copolymer (EVA) resin. In the present invention, the base layer 55 may be preferably transferred in the form of dots on the breathable waterproof membrane layer 50 as shown in FIGS. 1 and 2.

Also, a hot-melt adhesive layer 30 may be formed on the base layer 55. The hot-melt adhesive layer 30 is a part for attaching the breathable waterproof membrane layer 50 to a fabric substrate for preparing clothing, wherein, after preparing the thermally-bondable multi-layered composite film 100 of the present invention, the hot-melt adhesive layer 30 may be melted by applying heat to the the thermally-bondable multi-layered composite film 100, and, here, the thermally-bondable multi-layered composite film 100 may be in contact with and thermally bonded to the fabric substrate by applying a pressure thereto.

The hot-melt adhesive refer to a heat-melting adhesive that uses a nonvolatile and nonflammable thermoplastic resin in a solid phase at room temperature without using water or a solvent and is melted in a liquid phase by applying heat thereto, and then is applied to a subject to be attached, and then exhibits adhesive strength as the adhesive cools and solidifies.

In particular, the heat-melting adhesive used in the present invention does not use a solvent during a coating process and thus is more eco-friendly compared to a coating process using a conventional adhesive resin dissolved in a solvent.

In the present invention, the base layer 55 and the hot-melt adhesive layer 30 provided on the base layer 55 may each be provided in the form of dots and thus may form a double dot layer 60.

A density of the double dot layer 60 formed on the breathable waterproof membrane layer 50 of the present invention may be appropriately chosen and implemented.

That is, FIG. 3 is a top view of the thermally-bondable multi-layer membrane 100 of the present invention having the double dot layer 60. As shown in FIG. 3, a formation density of the double dot layer 60 may be represented by the number of dots of the double dot layer 60 formed in 1 $cm^2$ of a surface of the thermally-bondable multi-layer membrane 100, i.e., a unit density. In other words, in the present invention, a unit density of the double dot layer 60 may be preferably in a range of 30 dots/$cm^2$ to 220 dots/$cm^2$.

Also, as shown in FIG. 3, the formation density of the double dot layer 60 may be represented by the number of dots of the double dot layer 60 formed in a line on a 1-inch long line, i.e., a linear density. In the present invention, a linear density of the double dot layer 60 may be preferably in a range of 7 dots to 40 dots.

When the double dot layer 60 is formed within these unit density range and linear density range, a moisture permeability of the thermally-bondable multi-layered composite film 100 of the present invention may be maintained in a range of 3,000 $g/m^2/24$ h to 50,000 $g/m^2/24$ h, which does not result in significant deterioration of the moisture permeability, and thus the thermally-bondable multi-layered composite film 100 may have an excellent moisture permeability Also, since the hot-melt adhesive layer 30 has the most excellent adhesive strength, the membrane layer 50 may have excellent peeling durability and abrasion durability.

In addition, according to the first embodiment, a second adhesive layer 20 is provided on a lower portion of the breathable waterproof membrane layer 50, and the second adhesive layer 20 is a part for bonding the breathable waterproof membrane layer 50 and a knitted layer 10.

An adhesive used in the bonding of the breathable waterproof membrane layer 50 and the knitted layer 10 may be a common thermoplastic adhesive, i.e., polyvinyl acetate, polyvinyl chloride, or polystyrene, but, in particular, a solvent-type polyurethane adhesive may be preferably used in the present invention. The solvent-type polyurethane adhesive may easily wet the breathable waterproof membrane layer 50 and the knitted layer 10 and may easily form a covalent bond with a surface of the breathable waterproof membrane layer 50 and the knitted layer 10 and thus may have excellent adhesive strength.

A bonding process of the breathable waterproof membrane layer 50 and the knitted layer 10 may be performed by first coating the solvent-type polyurethane adhesive on one side of the breathable waterproof membrane layer 50 and then attaching the knitted layer 10 to the side of the breathable waterproof membrane layer 50 coated with the solvent-type polyurethane adhesive.

The solvent-type polyurethane adhesive may be coated on one side of the breathable waterproof membrane layer 50, and then the breathable waterproof membrane layer 50 coated with the solvent-type polyurethane adhesive may be bonded to the knitted layer 10, after which the organic solvent may be volatilized using hot air, thereby completing the bonding process.

That is, as shown in FIG. 5, a coating process of the solvent-type polyurethane adhesive may include, while moving the breathable waterproof membrane layer 50 on a plurality of rotating rollers 12, coating a casting dope 33 prepared by dissolving the solvent-type polyurethane adhesive resin in an appropriate solvent on the moving breathable waterproof membrane layer 50 using a knife coating equipment.

The casting dope 33 coated on the breathable waterproof membrane layer 50 may undergo a knife 25 provided at one side of rollers 12 while moving along with the rollers 12. Here, a thickness of the casting dope 33 coating the breathable waterproof membrane layer 50 may be controlled by a height of the knife 25. Thereafter, the breathable waterproof membrane layer 50 and the knitted layer 10 may be bonded.

The solvent-type polyurethane adhesive used in the bonding process may generally be used as dissolved in an organic solvent such as methyl ethyl ketone (MEK) or dimethyl formamide (DMF). A surface of the adhesive is very smooth and thus may have good friction resistance, and the adhesive has various advantages such as elasticity, flexibility, and resistance to chemicals. In this regard, the adhesive may be widely used for various purposes such as coating, painting, and bonding of fabrics.

In the bonding process, a coating amount of the solvent-type polyurethane adhesive coating the breathable waterproof membrane layer 50 to form the second adhesive layer 20 may be preferably in a range of 10 g/m$^2$ to about 30 g/m$^2$. That is, when the amount of the solvent-type polyurethane adhesive coating the breathable waterproof membrane layer 50 is greater than 30 g/m$^2$, the texture of the knitted layer 10 may be excessively hardened, which may degrade the tactile feel. On the other hand, when the amount of the solvent-type polyurethane adhesive coating the breathable waterproof membrane layer 50 is less than 10 g/m$^2$, the bonding strength between the breathable waterproof membrane layer 50 and the knitted layer 10 may be insufficient, and thus sufficient durability to withstand washing may not be obtained.

According to an embodiment of the present invention, a viscosity of the solvent-type polyurethane adhesive that is dissolved in an organic solvent and applied on the breathable waterproof membrane layer 50 may be preferably in a range of 1,000 cps to 20,000 cps.

After coating the second adhesive layer 20 prepared as described above on the breathable waterproof membrane layer 50, the breathable waterproof membrane layer 50 and the knitted layer 10 may be bonded. In the bonding process, when the knitted layer 10 attached to the breathable waterproof membrane layer 50 is passed through a pressing roller and then aged for 2 to 5 days, the knitted layer 10 is attached on a lower portion of the breathable waterproof membrane layer 50 and thus the breathable waterproof membrane layer 50 may have durability enough to exhibit breathability and waterproofing properties.

Here, the coating of the second adhesive layer 20 may be applied on the entire surface or may be preferably performed as intermittent coating in terms of maintaining good breathability or flexibility of base fibers. The intermittent coating method may be a method of coating in the form of dots or a method of coating in the form of mesh, among which the method of coating in the form of dots may be preferable, but embodiments are not limited thereto.

As described above, the knitted layer 10 may be bonded on a lower portion of the breathable waterproof membrane layer 50 having the double dot layer 60 formed thereon through the second adhesive layer 20.

When the knitted layer 10 is disposed on a lower portion of the breathable waterproof membrane layer 50 as described above, the fabric substrate used in the preparation of outdoor clothing does not need an inner lining.

That is, a fabric substrate for preparation of outdoor clothing typically includes an outer lining, an inner lining, and a membrane layer between the outer lining and the inner lining. Accordingly, a manufacture process of the fabric substrate for preparation of outdoor clothing is complicated and thus becomes a major cause of increasing a manufacturing cost.

In the present invention, as described above, when the knitted layer 10 is formed on a lower portion of the breathable waterproof membrane layer 50, the breathable waterproof membrane layer 50 and the knitted layer 10, which serves as an inner lining, may be simultaneously attached to each other during a laminating process for preparation of outdoor clothing, and thus a manufacture process of a fabric substrate for preparation of outdoor clothing may be simplified, which may decrease a manufacturing cost of clothing.

The knitted layer 10 may be knitted using vegetable fibers such as cotton and hemp, animal fibers such as silk and wool, and synthetic fibers of at least one of polyamide fibers, polyester fibers, acrylic fibers, rayon fibers, and polypropylene fibers.

Particularly, the knitted layer 10 in the present invention may be preferably prepared using nylon or polyester processed yarn, and a basis weight of the knitted layer 10 may be preferably in a range of 15 g/m$^2$ to 45 g/m$^2$ or, particularly, in a range of 16 g/m$^2$ to 35 g/m$^2$.

When the basis weight of the knitted layer 10 is greater than 45 g/m$^2$, a weight of the prepared outdoor clothing may be heavy, which may result insufficient flexibility of the clothing, and thus preparing the outdoor clothing in a light weight may not be possible. Also, when the basis weight of the knitted layer 10 is less than 15 g/m$^2$, appearance of the prepared outdoor clothing may be poor, and thus the basis weight of the knitted layer 10 may be preferably in a range of 15 g/m$^2$ to 45 g/m$^2$.

Particularly, the knitted layer 10 may be most preferably knitted using a warp knitted fabric or a circular knitted fabric, and the reason is because a knitted fabric having a texture of the warp knitted fabric or circular knitted fabric has excellent elasticity, flexibility, and drapability, which has an advantage of not forming wrinkles at the attached site.

Also, a method of preparing a knitted fabric may include a low gauge knitting loosely, high gauge knitting tightly, and middle gauge knitting intermediate of the low gauge and the high gauge. The gauge denotes the number of needles in 1 inch and is classified into a high gauge when the number of needles in 1 inch is 26 or higher and a low gauge when the number of needles in 1 inch is 20 or lower. In the present invention, the knitted layer 10 may be preferably knitted in a range of 28 gauges to 42 gauges.

As described above, the thermally-bondable multi-layered composite film 100 for preparing outdoor clothing, according to the first embodiment, may be prepared by including a breathable waterproof membrane layer 50; a base layer 55 provided on the breathable waterproof membrane layer 50; a hot-melt adhesive layer 30 provided on the base layer 55; a second adhesive layer 20 provided in the form of dots on a lower portion of the breathable waterproof membrane layer 50; and a knitted layer 10 provided on a lower portion of the second adhesive layer 20.

Also, a thermally-bondable multi-layered composite film 100 for preparing outdoor clothing, according to a second embodiment, may include, as same as in the first embodiment, a breathable waterproof membrane layer 50; a base layer 55 provided on the breathable waterproof membrane layer 50; a hot-melt adhesive layer 30 provided on the base layer 55; a second adhesive layer 20' provided on a lower portion of the breathable waterproof membrane layer 50; and a knitted layer 10 provided on a lower portion of the second adhesive layer 20'.

However, the thermally-bondable multi-layered composite film 100 for preparing outdoor clothing according to the second embodiment is characterized in that the second adhesive layer 20' formed on a lower portion of the breathable waterproof membrane layer 50 coats over the entire surface of the breathable waterproof membrane layer 50.

When the second adhesive layer 20' coats over the entire surface of the breathable waterproof membrane layer 50 as described above, waterproofing and windproofing properties of the thermally-bondable multi-layered composite film 100 according to the present invention may be improved. Therefore, outdoor clothing prepared using the thermally-bondable multi-layered composite film 100 according to the second embodiment of the present invention may provide clothing having excellent heat retaining properties to the wearer.

That is, generally, in order to give breathability and waterproofing properties to most outdoor clothing, a breathable and waterproofing film that allows water vapor such as sweat inside the clothing to pass through to the outside and blocks moisture such as rain from the outside not to seep into the clothing is attached to the clothing through a laminating process, and thus the outdoor clothing is prepared not to be wet by rain or snow (waterproof) and to discharge sweat (breathable), which helps controlling the body temperature and maintaining a comfortable feeling for the wearer.

The breathable and waterproofing film has pores capable of discharging water vapor inside the film, which provide breathable properties to the outdoor clothing but degrades the waterproofing and windproofing properties of the outdoor clothing.

In other words, a breathable and waterproofing fabric prepared using the breathable and waterproofing film is rather focused on a breathable function than the waterproofing or windproofing functions, and thus when the wearer is sweating due to increased activity, the film serves as a medium that controls transfer of heat and moisture, which provides an excellent function of efficiently discharging heat and sweat generated from the body. However, the waterproofing and windproofing properties of the fabric are relatively degraded, and thus there is a problem that the wearer of the outdoor clothing prepared using the fabric may experience poor heat retaining properties.

In this regard, when the thermally-bondable multi-layered composite film 100 according to the second embodiment of the present invention is applied to preparation of outdoor clothing, waterproofing and windproofing properties of the outdoor clothing may improve, and thus the outdoor clothing having excellent heat retaining properties may be provided.

The thermally-bondable multi-layered composite film 100 thus prepared and having the second adhesive layer 20' coated on the entire surface thereof according to the second embodiment of the present invention is later thermally bonded to a fabric substrate in the same manner as in the first embodiment, and thus a functional fabric for preparation of outdoor clothing may be manufactured.

Hereinafter, a method of preparing the thermally-bondable multi-layered composite film 100 of the present invention will be described with reference to FIGS. 4 and 5.

In the preparation process of the thermally-bondable multi-layered composite film 100 according to the present invention, a first step is a step of preparing a breathable waterproof membrane layer 50.

Thereafter, the preparation undergoes a second step of forming a second adhesive layer 20 under the breathable waterproof membrane layer 50.

A hot-melt adhesive or a solvent-type adhesive may be used in preparation of the second adhesive layer 20, and the hot-melt adhesive or the solvent-type adhesive may be at least one selected from the group consisting of a polyester, a polyamide, a polyester-based polyurethane, a polyether-based polyurethane, and a polycaprolactone-based polyurethane.

In the second step, the second adhesive layer 20 is formed on a lower portion of the breathable waterproof membrane layer 50 using the hot-melt adhesive or the solvent-type adhesive, and this is described with reference to FIG. 5.

That is, FIG. 5 is a process diagram illustrating a process of forming the second adhesive layer 20 on one side of the breathable waterproof membrane layer 50 using a solvent-based adhesive.

The solvent-based adhesive may be used, as shown in FIG. 5, by dissolving the solvent-based adhesive in an appropriate organic solvent and casting the solvent-based adhesive on one side of the breathable waterproof membrane layer 50. In the present invention, the solvent-type adhesive may be preferably a solvent-type polyurethane adhesive.

A coating method of the solvent-type polyurethane adhesive may include dissolving the solvent-type polyurethane adhesive in an appropriate organic solvent to form a casting dope 33, and casting the casting dope 33 on one side of the breathable waterproof membrane layer 50 using a knife coating equipment to form the second adhesive layer 20. After forming the second adhesive layer 20 using the knife coating equipment as described above, a knitted layer 10 is provided on one side of the breathable waterproof membrane layer 50 on which the second adhesive layer 20 is formed and pressed to perform bonding of the breathable waterproof membrane layer 50 and the knitted layer 10 in a third step.

That is, the casting dope 33 coated on a lower portion of the breathable waterproof membrane layer 50 undergoes a knife 25 provided at one side of rollers 12 while moving along with the rollers 12. Here, a thickness of the casting dope 33 coating the breathable waterproof membrane layer 50 may be controlled by a height of the knife 25. Then, in the third step, the breathable waterproof membrane layer 50 and the knitted layer 10 are bonded.

The second adhesive layer 20 may be provided in the form of dots as in FIG. 1 according to the first embodiment of the present invention. Also, as shown in FIG. 2, the second adhesive layer 20 may be formed by coating the solvent-type polyurethane adhesive on the entire surface according to the second embodiment.

Also, according to another embodiment of the present invention, the second adhesive layer 20 may be formed using a hot-melt adhesive. That is, a method of forming the second adhesive layer 20 using the hot-melt adhesive may include melting by heating the hot-melt adhesive and then casting the hot-melt adhesive between a lower surface of the breathable waterproof membrane layer 50 and the knitted layer 10. The hot-melt adhesive refer to a heat-melting adhesive that uses a nonvolatile and nonflammable thermoplastic resin in a solid phase at room temperature without using water or a solvent and is melted in a liquid phase by applying heat thereto, and then is applied to the breathable waterproof membrane layer 50, which is a subject to be attached, and then undergoes bonding with the knitted layer 10, and then exhibits adhesive strength after being dried.

The second adhesive layer 20 formed using the hot-melt adhesive or the solvent-based adhesive may be preferably coated at an amount in a range of 5 g/m$^2$ to 50 g/m$^2$ on a lower portion of the breathable waterproof membrane layer 50.

A thickness of the second adhesive layer 20 may be preferably in a range of 0.001 mm to 3 mm. That is, when the thickness of the second adhesive layer 20 is less than 0.001 mm, an adhesive strength between the knitted layer 10 and the breathable waterproof membrane layer 50 may decrease, and when the thickness of the second adhesive layer 20 is greater than 3 mm, the tactile feel of clothing products prepared using the second adhesive layer 20 may be deteriorated.

Here, the second adhesive layer 20 may be coated in the form of dots according to the first embodiment or of the entire surface coating according to the second embodiment as described above.

Also, as a fourth step, a base layer 55 is formed on the breathable waterproof membrane layer 50 bonded with the knitted layer 10. In the fourth step, a base resin is first melted and then transferred in the form of dots using a rotating upper screen roll 120 to form the base layer 55 on the breathable waterproof membrane layer 50.

That is, as shown in FIG. 4, the breathable waterproof membrane layer 50 bonded with the knitted layer 10 is inserted between the upper screen roll 120 and a lower roller 200 and moved in a direction of an arrow to form the base layer 55.

That is, in the fourth step, after melting the base resin in the upper screen roll 120, a melted product of the base resin is transferred in the form of dots on the breathable waterproof membrane layer 50 through a doctor blade 150 disposed at one side of the upper screen roll 120 to form the base layer 55.

The fourth step may preferably proceed using the upper screen roll 120. Particularly, when the base resin is transferred in the form of dots using the upper screen roll 120, the tactile feel and drapability of the breathable waterproof membrane layer 50 prepared therefrom may be excellent.

Also, as shown in FIG. 6, the upper screen roll 120 may preferably have outlet holes 15, wherein the base resin is melted and eluted through the outlet holes 15. The number of the outlet holes 15 per 1 cm$^2$ of the upper screen roll 120 may be preferably in a range of 30 to 180, and a diameter of each of the outflow holes 15 may be preferably in a range of about 350 µm to about 750 µm.

To describe the formation process of the base layer 55 in further detail, the base resin is coated on the breathable waterproof membrane layer 50 in the form of dots through the upper screen roll 120 as shown in FIG. 4, and thus the base layer 55 is formed. Here, an amount of the base resin transferred in the form of dots on the breathable waterproof membrane layer 50 may be preferably in a range of 5 g/m$^2$ to 30 g/m$^2$.

When the amount of the base resin is greater than 30 g/m$^2$, the texture of a fabric may be too hardened, which may degrade the tactile feel of the fabric, and when the amount of the base resin is less than 5 g/m$^2$, poor adhesion with the fabric may occur, and the membrane layer 50 may sag by gravity, which may result in deterioration of workability.

A transfer rate of the base layer 55 may be most preferably in a range of 20 meters to 30 meters per minute. Also, according to an embodiment of the present invention, a melt viscosity of the base resin may be most preferably in a range of 7,000 cps to 45,000 cps.

The base layer 55 may be formed by melting one base resin selected from an acryl-based resin, a polyurethane, a polyamide, a polyester, a polyolefin, polyvinyl chloride (PVC), and an ethylene-vinyl acetate (EVA) copolymer by applying an appropriate temperature thereto.

Then, as a fifth step, hot-melt adhesive powders 35 are scattered on an upper portion of the base layer 55.

The base layer 55 provided in the form of dots in the fourth step is a melted product that has been produced by applying an appropriate temperature to the base resin and is transferred in the form of dots on the breathable waterproof membrane layer 50 using the upper screen roll 120. In the fifth step, the hot-melt adhesive powders 35 are scattered on the baser layer 55 before the melted product of the base resin transferred in the form of dots is cooled and solidified.

That is, the hot-melt adhesive powders 35 having a particle size in a range of 80 µm to 200 µm filled in a hopper 160 are supplied to the breathable waterproof membrane layer 50 having the base layer 55 thereon using a scattering roll 250, and here a vibration brush 251 scatters the hot-melt adhesive powders 35 onto the base layer 55.

Here, the hot-melt adhesive powders 35 are scattered on the membrane layer 50 in the powder form and settled on the base layer 55 that is not yet solidified and thus may form a hot-melt adhesive layer 30 in the form of dots.

Then, the process may undergo a sixth step, in which the hot-melt adhesive powders 35 scattered on the membrane layer 50 other than the hot-melt adhesive powders 35 settled on the base layer 25 are suctioned and removed using a suction device 300.

Since the base resin forming the base layer 55 is in a state before solidification after being transferred on the breathable waterproof membrane layer 50 in the form of dots, the hot-melt adhesive powders 35 settled on the base layer 55 are attached on the base layer 55. However, the hot-melt adhesive powders 35 that are not settled on the base layer 55 and fell on the breathable waterproof membrane layer 50 are suctioned by the suction device 300 and removed from a surface of the breathable waterproof membrane layer 50 in the sixth step.

Subsequently, the process may undergo a seventh step, in which the breathable waterproof membrane layer 50, from which the hot-melt adhesive powders 35 not settled on the base layer 55 have been removed, passes through a tenter 350, and thus the hot-melt adhesive powders 35 on the breathable waterproof membrane layer 50 are melted to form a hot-melt adhesive layer 30 in the form of dots on the base layer 55. That is, in the seventh step, the hot-melt adhesive powders 35 are melted on the base layer 55 that has been transferred in the form of dots to form the hot-melt adhesive layer 30 in the form of dots, thereby forming a double dot layer 60.

The seventh step may include evaporating moisture contained in the double dot layer 60 prepared as described above and thermally fixing the base layer 55 and the hot-melt adhesive layer 30 formed on the base layer 55.

Here, a temperature condition of the tenter 350 may be appropriately set according to the melting temperature of the hot-melt adhesive.

In the seventh step, the hot-melt adhesive powders 35 settled on the base layer 55 form the hot-melt adhesive layer 30 on the base layer 55 in the form of dots at the same time the hot-melt adhesive powders 35 are melt.

Here, the hot-melt adhesive layer 30 formed at a rate of 10 g/m$^2$ to 20 g/m$^2$ may provide the most excellent adhesive strength after being thermally-bonded to the fabric substrate, and this may allow forming the breathable waterproof membrane layer 50 with excellent peeling durability and abrasion durability.

After transferring the base layer 55 in the form of dots on the breathable waterproof membrane layer 50 as described above, the hot-melt adhesive layer 30 is provided in the form of dots on the base layer 55, thereby completing formation of the double dot layer 60.

After completing the seventh step, the process may undergo an eighth step, in which the double dot layer 60 consisting of the base layer 55 and the hot-melt adhesive layer 30 is cooled. In the eighth step, the double dot layer 60 is cooled using a cooling roll 400, thereby completing preparation of the thermally-bondable multi-layered composite film 100 of the present invention.

The thermally-bondable multi-layered composite film 100 of the present invention completed through these steps described above is thermally bonded to a fabric substrate for preparing clothing by applying heat and pressure thereto, and thus may allow preparation of a fabric having breathability and waterproofing properties or heat retaining properties, etc. Also, as a functional fabric may be manufactured by a laminating process, steps of a sewing process for preparing outdoor clothing may be reduced, and thus a price competitiveness of the final product may increase.

While the present invention has been particularly shown and described with reference to exemplary embodiments thereof, it will be understood by those of ordinary skill in the art that various changes in form and details may be made therein without departing from the scope of the present invention. It will also be understood by those skilled in the art that those of ordinary skill in the art may readily understand that various changes and modifications may be made without departing from the spirit or essential characteristics of the present invention. Therefore, it should be understood that the embodiments described above are illustrative in all aspects and should not be construed as limiting the scope of the present invention.

The invention claimed is:

1. A thermally-bondable multi-layered composite film, which is attached to a fabric substrate to prepare a fabric for outdoor clothing, comprising:
a breathable waterproof membrane layer;
a base layer provided in the form of dots on an upper portion of the breathable waterproof membrane layer;
a hot-melt adhesive layer provided in the form of dots at a rate of 10 g/m$^2$ to 20 g/m$^2$ on an upper portion of the base layer to form a double dot layer;
a second adhesive layer on a lower portion of the breathable waterproof membrane layer, wherein the second adhesive layer is a solvent-type polyurethane adhesive coated in a range of 10 g/m$^2$ to 30 g/m$^2$; and
a knitted layer on a lower portion of the second adhesive layer, wherein a basis weight of the knitted layer is in a range of 15 g/m$^2$ to 45 g/m$^2$,
wherein the double dot layer is formed at a unit density in a range of 30 dots/cm$^2$ to 220 dots/cm$^2$, and a linear density of the double dot layer is in a range of 7 dots to 40 dots/inch.

2. The thermally-bondable multi-layered composite film of claim 1, wherein the second adhesive layer is formed in the form of dots or as a coating disposed on an entire surface.

3. The thermally-bondable multi-layered composite film of claim 1, wherein the knitted layer is a warp knitted fabric or a circular knitted fabric.

4. The thermally-bondable multi-layered composite film of claim 1, wherein a moisture permeability of the thermally-bondable multi-layered composite film is in a range of 3,000 g/m$^2$/24 h to 50,000 g/m$^2$/24 h.

5. The thermally-bondable multi-layered composite film of claim 1, wherein the knitted layer is prepared of at least one selected from the group consisting of vegetable fibers, animal fibers, and synthetic fibers.

6. The thermally-bondable multi-layered composite film of claim 1, wherein the base layer is formed of one selected from an acryl-based resin, a polyurethane-based resin, a polyamide-based resin, a polyester-based resin, a polyolefin-based resin, a polyvinyl chloride resin, and an ethylene vinyl acetate copolymer resin.

7. The thermally-bondable multi-layered composite film of claim 1, wherein the breathable waterproof membrane layer is prepared of one selected from a polyurethane, polyethylene terephthalate, polybutylene terephthalate a polyamide, polytetrafluoroethylene, a silicone resin, polyethylene, polypropylene, a vinyl chloride resin, a synthetic rubber, and natural rubber.

8. The thermally-bondable multi-layered composite film of claim 1, wherein the hot-melt adhesive layer is formed of one selected from a polyamide-based resin, a polyurethane-based resin, an ethylene vinyl acetate copolymer resin, and a polyester-based resin.

9. The thermally-bondable multi-layered composite film of claim 1, wherein the second adhesive layer is formed of at least one selected from the group consisting of a polyamide-based resin, a polyurethane-based moisture curing type adhesive, a two-part type polyurethane adhesive, a thermosetting hot melt polyurethane adhesive, an ethylene vinyl acetate-based adhesive, a polyester-based hot melt adhesive, an acrylic adhesive, and an ethylene vinyl acetate copolymer adhesive.

10. The thermally-bondable multi-layered composite film of claim 1, wherein a thickness of the breathable waterproof membrane layer is in a range of 0.10 mm to 0.30 mm.

11. A functional fabric comprising:
a fabric substrate; and
a thermally-bondable multi-layered composite film of claim 1, thermally bonded to one side of the fabric substrate.

* * * * *